(12) United States Patent
Shimek et al.

(10) Patent No.: US 10,689,104 B2
(45) Date of Patent: Jun. 23, 2020

(54) TAIL ROTOR INTEGRATED DAMPER ATTACHMENT

(71) Applicant: Textron Innovations Inc., Providence, RI (US)

(72) Inventors: Glenn Alan Shimek, Kennedale, TX (US); Nathan Patrick Green, Mansfield, TX (US); Robert Alan Self, Ft. Worth, TX (US); Mark Adam Wiinikka, Hurst, TX (US)

(73) Assignee: TEXTRON INNOVATIONS INC., Providence, RI (US)

( * ) Notice: Subject to any disclaimer, the term of this patent is extended or adjusted under 35 U.S.C. 154(b) by 466 days.

(21) Appl. No.: 15/590,736

(22) Filed: May 9, 2017

(65) Prior Publication Data

US 2018/0327089 A1    Nov. 15, 2018

(51) Int. Cl.
*B64C 27/51*  (2006.01)
*B64C 27/82*  (2006.01)
*B64C 27/54*  (2006.01)
*B64C 27/48*  (2006.01)
*B64C 27/473* (2006.01)
(Continued)

(52) U.S. Cl.
CPC .............. *B64C 27/51* (2013.01); *B64C 27/39* (2013.01); *B64C 27/473* (2013.01); *B64C 27/48* (2013.01); *B64C 27/54* (2013.01); *B64C 27/82* (2013.01); *B29L 2031/082* (2013.01); *B64C 27/32* (2013.01); *B64C 2027/003* (2013.01); *B64C 2027/4736* (2013.01)

(58) Field of Classification Search
CPC ... B29L 2031/082; B64C 27/32; B64C 27/39; B64C 27/473; B64C 27/48; B64C 27/51; B64C 27/54; B64C 27/82; B64C 2027/003; B64C 2027/4736
See application file for complete search history.

(56) References Cited

U.S. PATENT DOCUMENTS 3,625,631 A  * 12/1971  Covington, Jr. ........ B64C 27/50
                                                              416/1
4,110,056 A    8/1978  Stevenson
(Continued)

FOREIGN PATENT DOCUMENTS

EP    2123556 A1    11/2009
WO    02090184 A1   11/2002
(Continued)

*Primary Examiner* — Patrick Hamo
*Assistant Examiner* — Joseph S. Herrmann
(74) *Attorney, Agent, or Firm* — Slater Matsil, LLP

(57) ABSTRACT

A system and method for attaching a damper to a tail rotor blade includes a cuff that is integral with the rotor blade. The cuff has upper and lower lugs formed by extending a skin over a blade core of the rotor blade. The skin extends past the blade core to the root end of the rotor blade. The rod end of the damper is inserted into an opening between the lugs. The rod end of the damper is coupled to the blade with a bolt through aligned holes in the lugs. The cuff also couples the rotor blade to the grip inside the cuff. The cuff includes a same material as that forming the skin. Sacrificial buffer pads are applied to interior faces of the lugs. The buffer pads permit a distance between the lugs to be machined within a tolerance without removing skin from the cuff.

20 Claims, 11 Drawing Sheets

(51) Int. Cl.
  *B64C 27/39* (2006.01)
  *B29L 31/08* (2006.01)
  *B64C 27/32* (2006.01)
  *B64C 27/00* (2006.01)

(56) References Cited

U.S. PATENT DOCUMENTS

| | | | |
|---|---|---|---|
| 4,696,623 A | | 9/1987 | Bost |
| 4,828,458 A | | 5/1989 | Pariani |
| 5,141,398 A | * | 8/1992 | Bietenhader ............ B64C 27/51 416/107 |
| 5,242,130 A | * | 9/1993 | Mouille ................ B64C 27/001 244/17.13 |
| 5,562,416 A | * | 10/1996 | Schmaling .............. B64C 27/48 416/134 A |
| 6,659,722 B2 | * | 12/2003 | Sehgal .................. B64C 27/473 416/134 A |
| 8,226,355 B2 | * | 7/2012 | Stamps ................... B64C 27/32 415/119 |
| 8,500,407 B1 | | 8/2013 | Kennedy et al. |
| 8,622,703 B2 | * | 1/2014 | Girard .................... B64C 27/35 416/134 A |
| 9,096,316 B2 | * | 8/2015 | Lee .......................... B32B 3/12 |
| 9,212,680 B2 | * | 12/2015 | Schneider ............. B64D 11/003 |
| 9,481,455 B2 | | 11/2016 | Yuce et al. |
| 2015/0336664 A1 | | 11/2015 | Rauber et al. |

FOREIGN PATENT DOCUMENTS

| | | |
|---|---|---|
| WO | 2009078871 A1 | 6/2009 |
| WO | 2009131600 A2 | 10/2009 |

\* cited by examiner

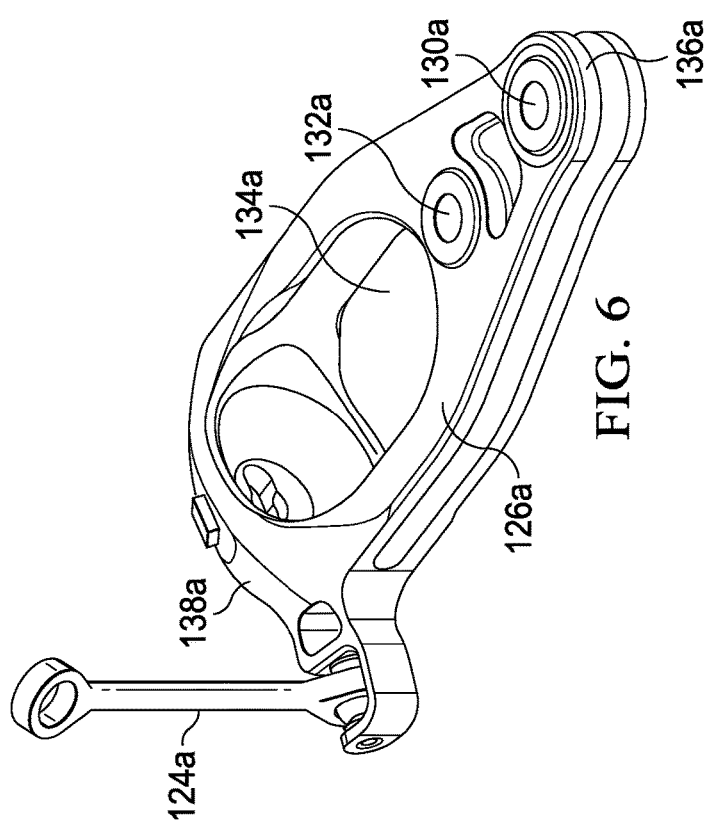
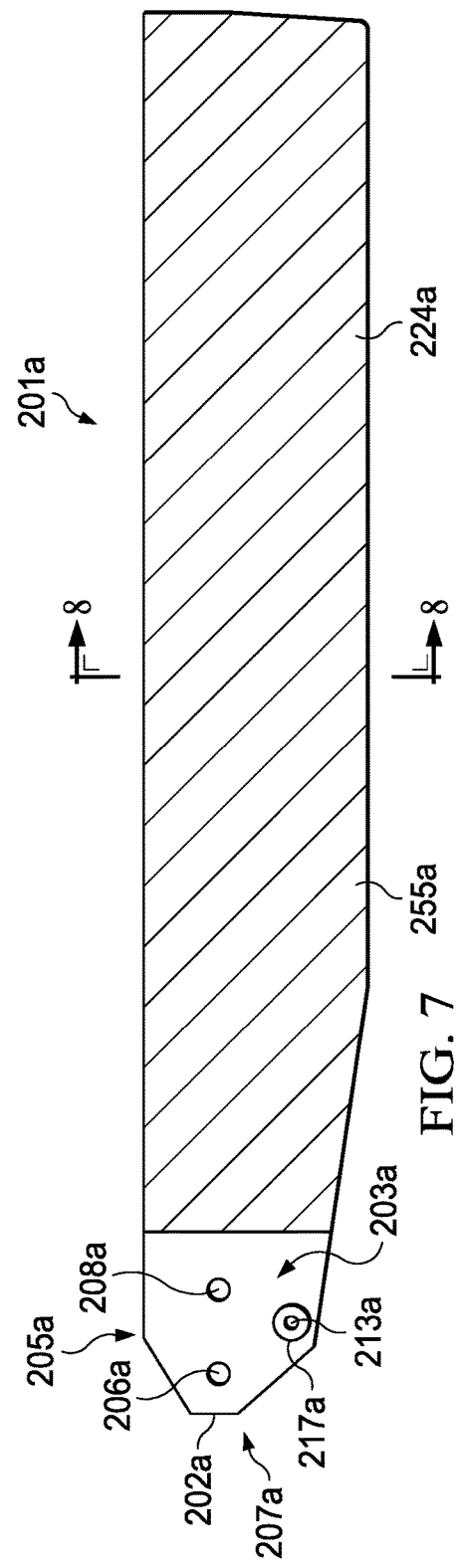
FIG. 6
FIG. 7

TAIL ROTOR INTEGRATED DAMPER ATTACHMENT

TECHNICAL FIELD

The present invention generally relates to a system and method for attaching a damper to a tail rotor blade, as well as the manufacture and maintenance thereof.

BACKGROUND

Rotorcrafts with multi-blade rotor hub configurations often include a main rotor assembly for supplying forces for flight, and a tail rotor assembly (sometimes referred to as an anti-torque system) that stabilizes and influences the flight direction of the rotorcraft. The rotor blades (sometimes called tail rotors) in the tail rotor assembly are subject to internal and external disturbances affecting maneuverability of the rotorcraft. One example of an external disturbance is wind that can create undesirable vibrations in the tail rotor assembly transmitted to the body of the rotorcraft. An example of an internal disturbance is oscillations of the tail rotor blades relative to each other and the drive shaft. The oscillations may be caused by lead-lag movement of the blades or scissor-mode motions between blades of different blade pairs and rotation of the drive shaft.

Effects of these disturbances are more pronounced in rotorcraft due to radial air flow to the blades, as opposed to fixed wing aircraft propellers. Failure to treat or mitigate the effect of these disturbances increases mechanical stress resulting in fatigue of the tail rotor blades and other rotorcraft components. Catastrophic results can also occur in a "ground resonance" phenomenon when untreated oscillating frequency matches a resonant frequency of the rotorcraft. One way to treat or mitigate the effect involves using dampers to reduce the frequency or amplitude of unwanted vibrations to counter oscillations in the rotor blade assembly.

SUMMARY

In a representative embodiment of a device, a rotor blade includes a blade core and a material. The blade core has a root end and a tip end opposite the root end. The blade core has an upper surface and a lower surface opposite the upper surface. The upper surface and lower surface extend between the root end and the tip end of the blade core. The rotor blade also includes a material covering the upper surface and the lower surface of the blade core, and the material extends outwards away from the blade core past the root end. The material extending outwards away from the blade core forms a cuff that is integral with the upper surface and the lower surface of the rotor blade. The cuff is configured to receive a first end of a damper inside the cuff.

In other embodiments, one general aspect includes a rotor assembly. The rotor assembly includes a mast, a yoke, a rotor blade, a grip, and a damper. The mast has a principal axis, and is configured to rotate around the principal axis. The yoke is splined to the mast, and is configured to rotate with a rotation of the mast. The rotor blade is configured to rotate with the yoke around the principal axis. The rotor blade has a tip end distally disposed from the yoke and a root end proximate the yoke. The grip couples the rotor blade to the yoke at a root end of the rotor blade. The damper is coupled to the yoke and the rotor blade. The rotor blade includes a blade core and a sleeve. The sleeve includes a first portion surrounding the blade core, and a second portion extending past the blade core toward the root end of the rotor blade. The second portion of the sleeve forms a cuff that is integral with the rotor blade. The cuff is configured with an opening for receiving a first end of the grip and a second end of the damper, and for attaching the grip and the damper to the rotor blade inside the cuff.

In other embodiments, another general aspect includes a method for making a damper attachment and installing a damper. An upper skin of a rotor blade is bonded to an upper surface of a blade core of the rotor blade. The upper skin includes a composite material. A portion of the upper skin extends outwards from the root end of the blade core to form an upper lug. A lower skin of the rotor blade is bonded onto a lower surface of the blade core, where the lower surface is opposite the upper surface. The lower surface includes the composite material. A portion of the lower skin extends outwards from the root end of the blade core to form a lower lug. The upper lug and the lower lug form an integral cuff (e.g., the cuff is integral with the rotor blade). The cuff has an opening between the upper lug and the lower lug. The cuff is configured to attach the damper to the rotor blade inside the cuff. Other embodiments of this aspect include corresponding components or parts, each configured to perform actions of the methods.

BRIEF DESCRIPTION OF THE DRAWINGS

Aspects of the present disclosure may be understood from the following detailed description when read in conjunction with the accompanying Figures. It is noted that, in accordance with standard practice in industry, various features may not be drawn to scale. For example, dimensions of various features may be arbitrarily increased or reduced for clarity of illustration or description. Corresponding numerals and symbols in different Figures generally refer to corresponding parts, unless otherwise indicated.

FIG. 6 representatively illustrates a perspective view of a grip and pitch link, according to some embodiments.

FIG. 7 is a partially exploded top view of a representative rotor blade, according to some embodiments.

DETAILED DESCRIPTION

Figure 1:
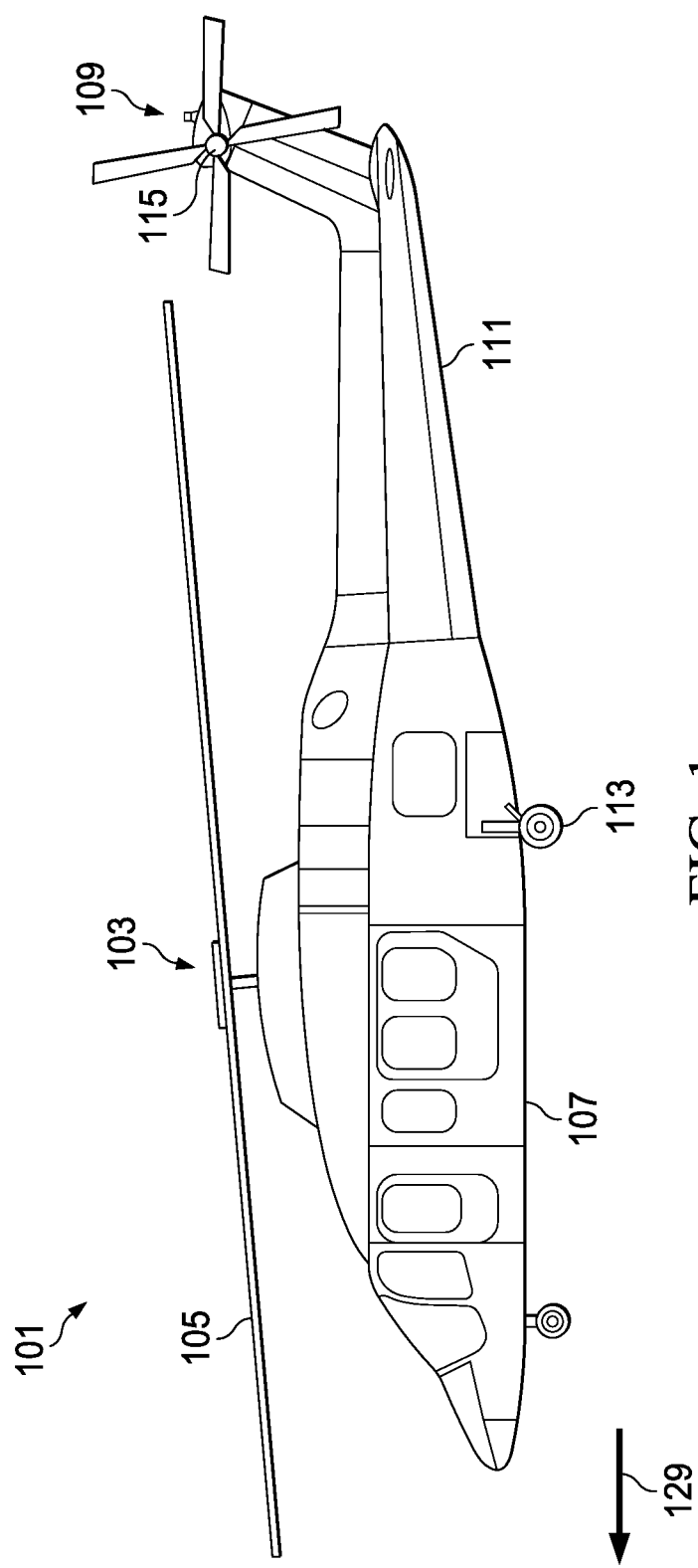
FIG. 1 representatively illustrates a rotorcraft, according to some embodiments.

The following disclosure provides different representative embodiments, or examples, for implementing different features of the subject matter disclosed herein. Specific examples of components and arrangements are described below to simplify the present disclosure. These are, of course, merely examples and are not intended to be limiting. In addition, the present disclosure may repeat reference numerals or letters in various examples. This repetition is for simplicity and clarity of discussion, and does not in itself dictate a relationship between various embodiments or configurations. Therefore, various changes, substitutions, or alterations can be made herein without departing from the spirit and scope of the appended claims.

Dampers have been increasingly used to eliminate or reduce unwanted vibrations or oscillations experienced in rotor blade assemblies. Representative means of attaching dampers to tail rotor blades are described herein—including a representative damper attachment joint that is integral with and internal to the tail rotor blade. Although an integral damper attachment joint is described in connection with a tail rotor assembly of a rotorcraft, it will be understood by those of skill in the art that embodiments described herein are applicable to main rotor assemblies and a wide variety of other applicable contexts.

A damper attachment joint that is integral with a rotor blade, and internal to the rotor blade, offers a number of benefits. An integral damper attachment joint adds little weight to an existing tail rotor assembly. The integral damper attachment joint is less expensive by virtue of adding fewer parts to the assembly. A reduced number of added parts simplifies installation and configuration of the damper in the tail rotor assembly, and simplifies inspection processes. The structural integrity and aerodynamic profile of the tail rotor blade is not as disrupted by a solution that reduces the number of holes that must be made in the tail rotor blade for attachment of the damper. Also, an implementation that attaches the damper to the tail rotor blade inside a part of the tail rotor blade reduces exposure of the joint to the outside elements.

Further, as more fully described below, an integral damper attachment provides a fail-safe failure mode for the joint that provides visual signs of wear or fatigue in the joint before the joint experiences catastrophic failure. The fail-safe failure mode of the damper attachment joint permits the rotorcraft to be safely operated even after visible signs of wear or fatigue begin to appear in the joint, instead of immediately having to ground the rotorcraft for maintenance or repair.

FIG. 1 representatively illustrates a rotorcraft 101 in accordance with some embodiments. Rotorcraft 101 has main rotor assembly 103 with a plurality of main rotor blades 105. Selective control of the pitch of each main rotor blade provides selective control of direction, thrust, and lift of rotorcraft 101. Rotorcraft 101 further includes body 107, tail boom in, and tail section 109 at end of tail boom in. Rotorcraft 101 further includes landing gear 113 to provide ground support for the aircraft. It should be appreciated that rotorcraft 101 is merely illustrative of a variety of aircraft that can implement embodiments disclosed herein. Other aircraft implementations may include hybrid aircraft, tilt rotor aircraft, tandem rotorcraft, unmanned aircraft, gyrocopters, or the like.

Tail rotor assembly 115 is in tail section 109. Tail rotor assembly 115 (sometimes referred to as an anti-torque rotor) prevents rotorcraft 101 from spinning due to the engine's generated torque that drives main rotor assembly 103, and due to reaction torque working on body 107. Tail rotor assembly 115 rotates much faster than main rotor assembly 103, and a same engine (not shown) may power main rotor assembly 103 and tail rotor assembly 115. Tail rotor assembly 115 is mounted for vertical or near vertical rotation in tail section 109. FIGS. 2-13 provide illustrations of tail rotor assembly 115 and representative components according to some embodiments.

Figure 2:
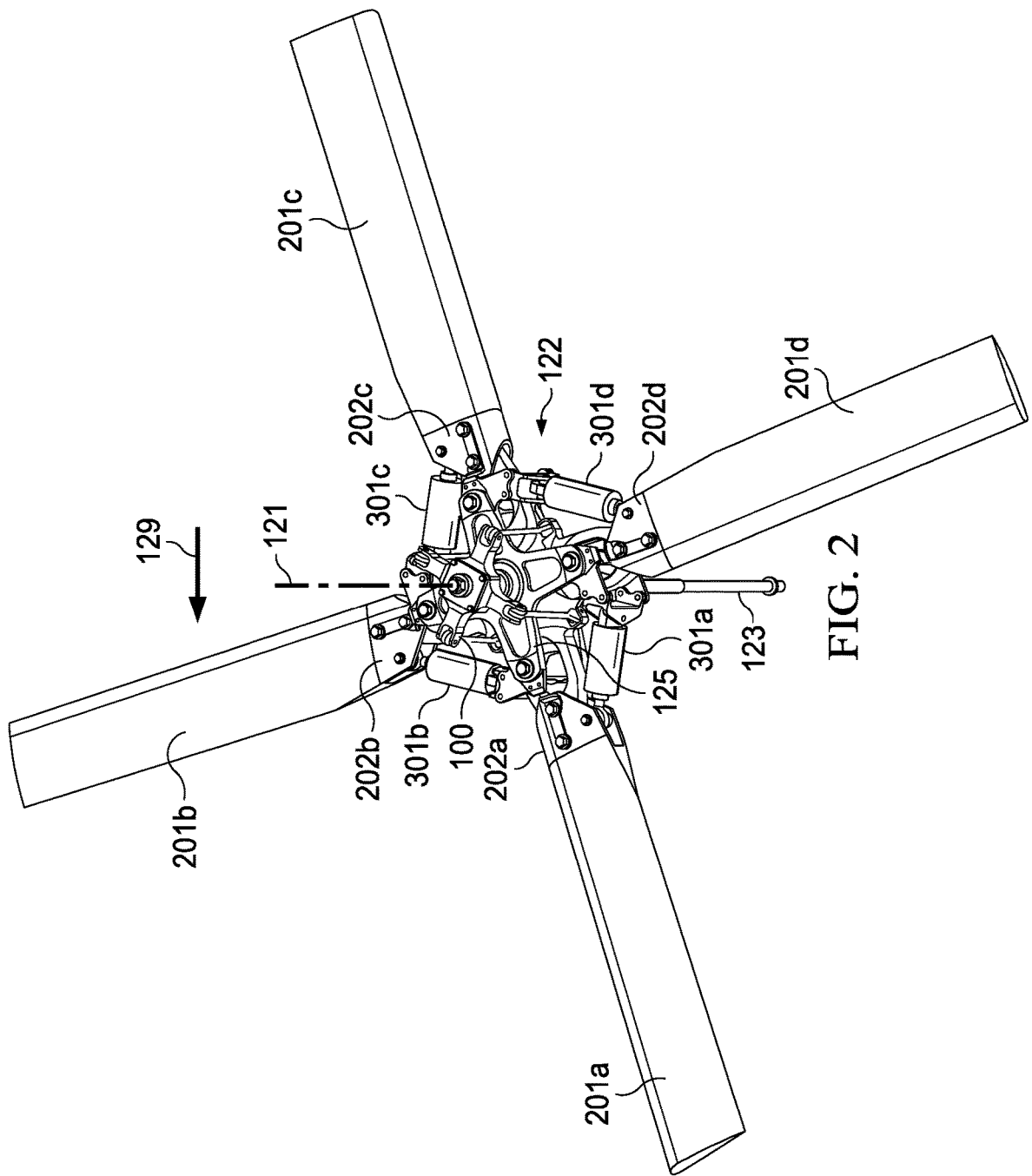
FIG. 2 is a perspective view of a representative tail rotor assembly, according to some embodiments.
Figure 3:
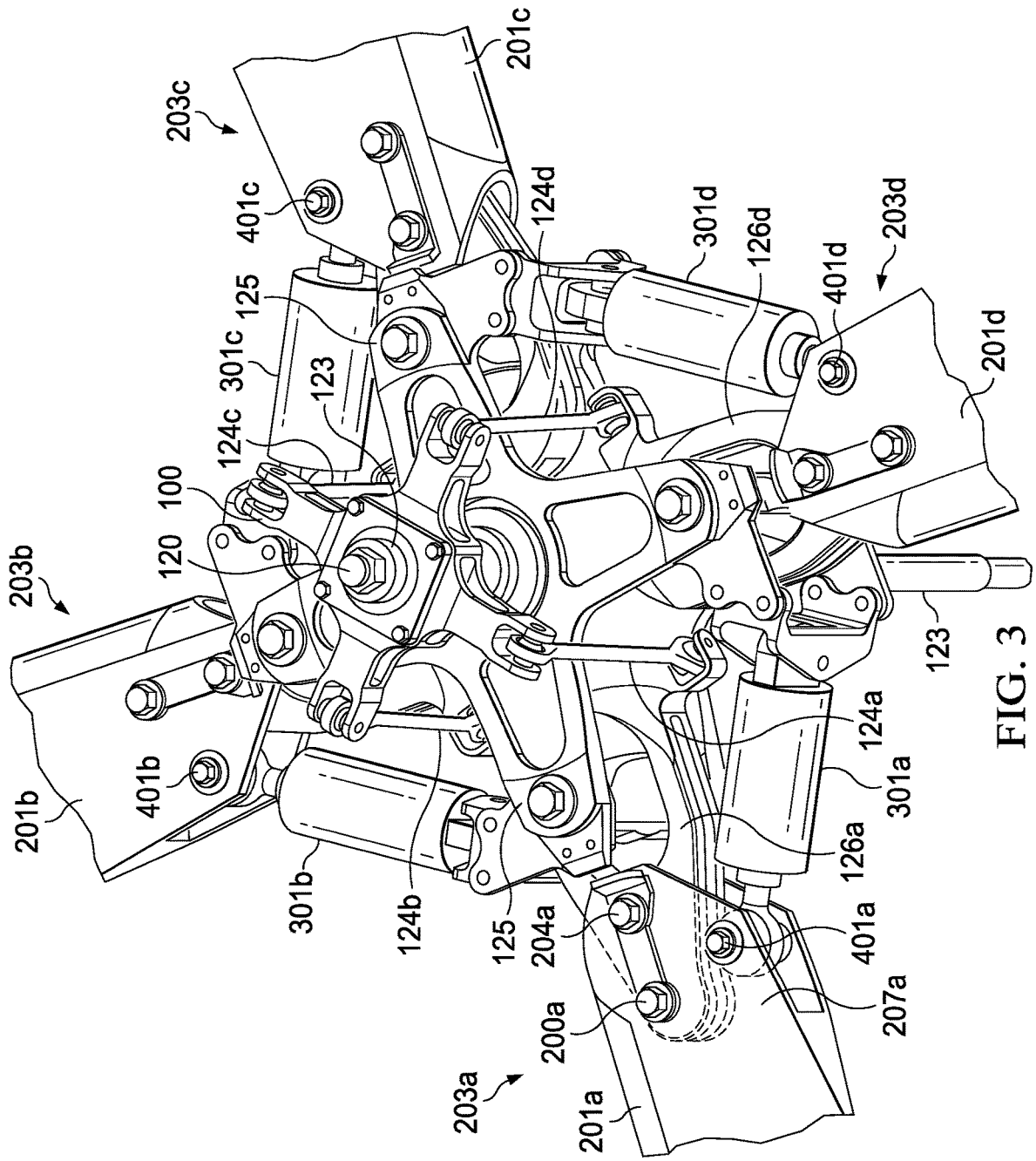
FIG. 3 representatively illustrates a perspective view of a tail rotor hub and a portion of rotor blades attached to a tail rotor hub, with a partially exploded view of one of the joints in the tail rotor hub, according to some embodiments.

FIGS. 2-3 provide perspective views of tail rotor assembly 115. Tail rotor assembly 115 includes an articulated hub, referred to herein as tail rotor hub 122, with four rotor blades 201a-201d connected to tail rotor hub 122. Each rotor blade 201a-201d is arranged orthogonally relative to a nearest-neighboring rotor blade (e.g., about ninety-degree spacing between rotor blades). Other embodiments may have a single rotor blade or a different number of rotor blades, or a different spacing between rotor blades.

To reduce unwanted vibrations or counter oscillations in rotor blades 201a-201d, tail rotor hub 122 includes four dampers 301a-301d arranged between rotor blades 201a-201d. Each damper 301a-301d is coupled with yoke 125. Dampers 301a-301d and other components of tail rotor hub 122 are illustrated according to some embodiments in FIG. 4 (e.g., without illustration of rotor blades 201a-201d). Tail rotor hub 122 also includes mast 123 splined with yoke 125. Control tube 120 is disposed inside mast 123. Mast 123 is configured to rotate about axis of rotation 121 (e.g., the principal axis of mast 123). Dampers 301a-301d are lead/lag dampers, and may comprise fluid-elastic and rotary dampers, although other types of dampers may be used in alternative or conjunctive embodiments. Crosshead 100 is disposed above yoke 125 and coupled to control tube 120. Crosshead 100 and control tube 120 are engaged in collectively changing pitch of rotor blades 201a-201d during operation of rotorcraft 101.

Coupling is described for a single rotor blade (i.e., rotor blade 201a), although it should be understood that other rotor blades (e.g., rotor blades 201b, 201c, 20d) are similarly coupled in some embodiments. Grip 126a fits inside cuff 207a at root end 202a of rotor blade 201a. Grip 126a has holes 130a and 132a at first end 136a (also as shown according to some embodiments in FIG. 6). Grip 126a is secured to rotor blade 201a inside cuff 207a with two bolts 200a, 204a through holes 206a, 208a in cuff 207a that are aligned with holes 132a, 130a of grip 126a. Opposite end 138a of grip 126a has space 134a configured to carry a centrifugal force (CF) bearing (not shown). The CF bearing is attached to yoke 125. Pitch link 124a is coupled to crosshead 100. Pitch link 124a may angle and vary pitch of rotor blade 201a in accordance with some embodiments, as described below.

Tail rotor assembly 115 develops thrust to counter torque effect created by main rotor assembly 103. In order to vary thrust, a pitch change mechanism in tail rotor hub 122 collectively changes the pitch of rotor blades 201 in response to pilot input.

Figure 4:
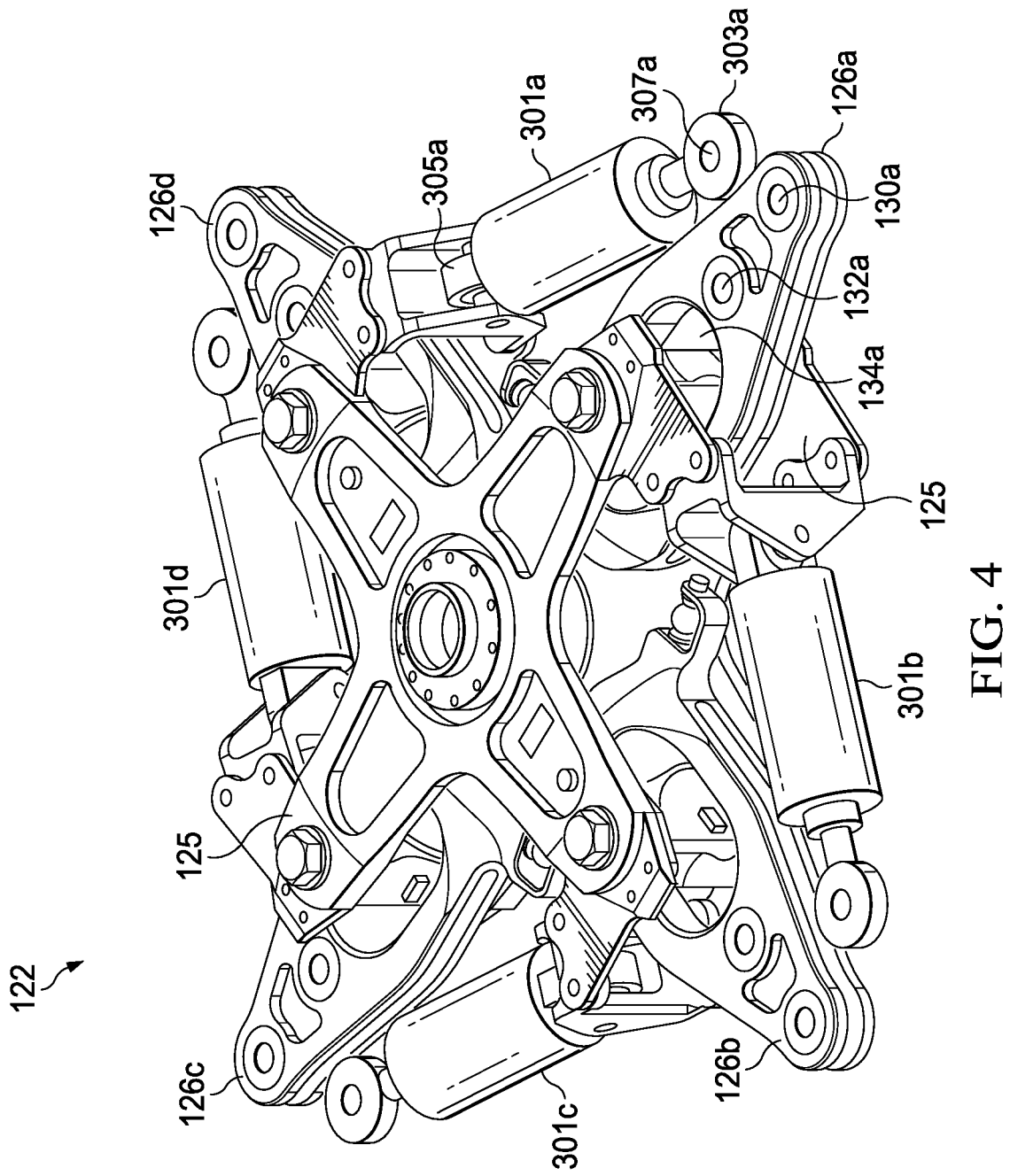
FIG. 4 is a perspective view of a representative tail rotor hub without rotor blades, according to some embodiments.
Figure 5:
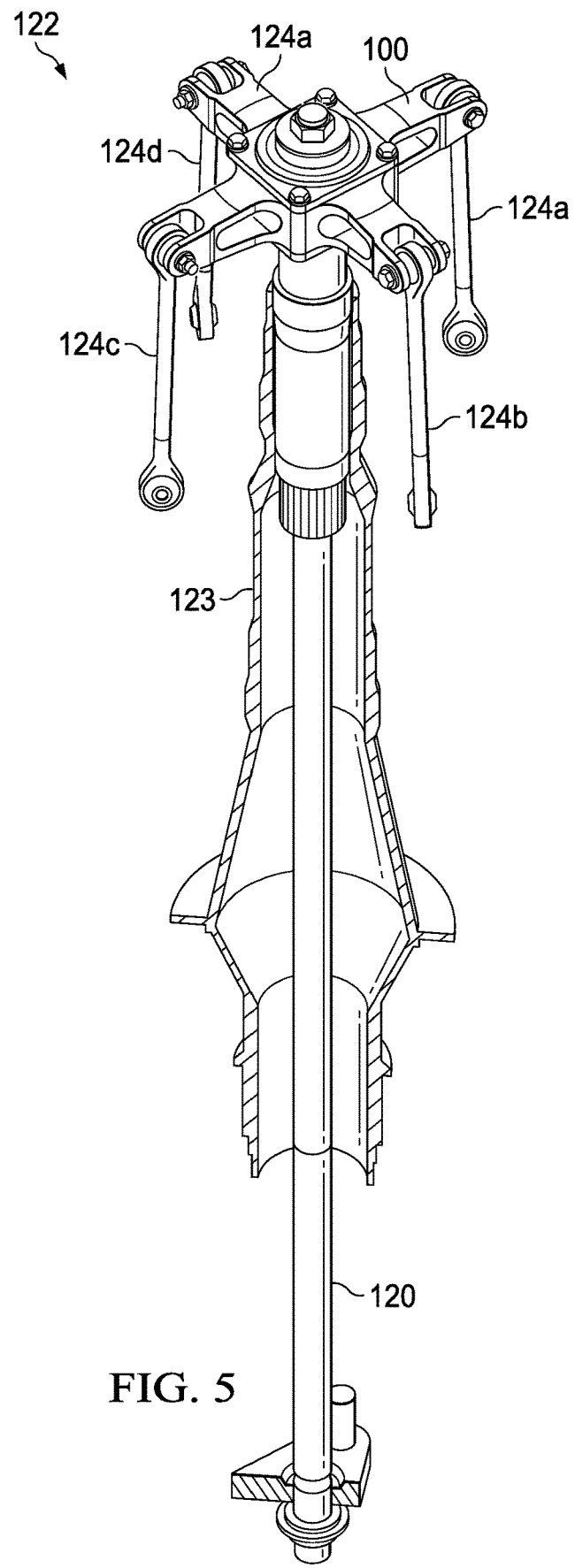
FIG. 5 representatively illustrates a perspective view of a crosshead, pitch links, and mast in a tail rotor assembly, according to some embodiments.

FIGS. 3-5 illustrate a pitch-change mechanism according to some embodiments that includes pitch links 124a-124d. Each pitch link 124a-124d are connected at one end to crosshead 100, and connected at an opposite end to one of respective grips 126a-126d. FIG. 6 representatively illustrates an example pitch link 124a connected to grip 126a at end 138a of grip 126a, although it will be understood that pitch links 124b-124d are similarly connected to grips 126b-126d. In other embodiments, pitch-change mechanisms may include one or more swash plates or flexible straps instead of, or in addition to, the above-described pitch-change mechanism.

FIGS. 3-4 also show attachment for dampers 301a-301d, with it being understood that the following explanation and additional figures relating to damper 301a and rotor blade 201a also show and describe how dampers 301b-301d and rotor blades 201b-201d are attached in tail rotor assembly 115 in some embodiments.

One representative joint 203a can be viewed in FIGS. 7-12. FIGS. 7-10 provide different views of rotor blade 201a. Rotor blade 201a may be symmetrical, without a twist in its profile. A symmetrical configuration generally reduces a drag profile because tail rotor assembly 115 is mounted with its axis of rotation 121 perpendicular to direction of flight 129 (as previously illustrated in FIG. 2). Alternatively-shaped rotor blades may include a twist or have a variety of other airfoil shapes, or include articulated members such as moveable flaps (not shown).

Figure 8:
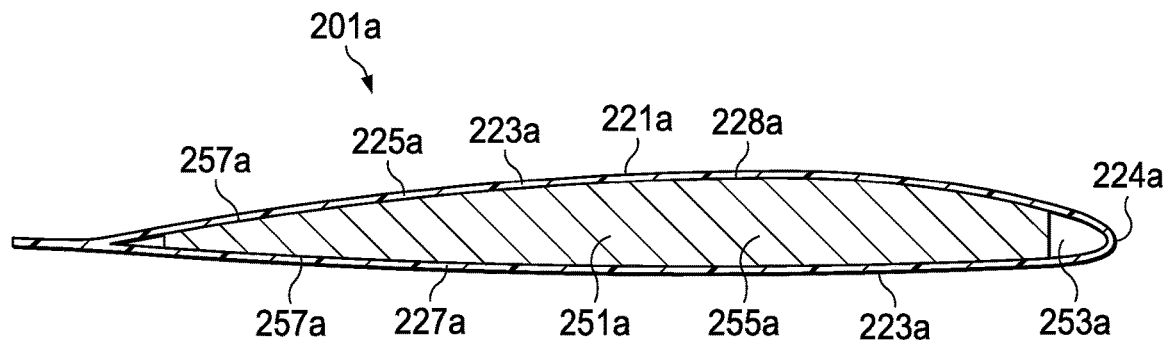
FIG. 8 is a cross-section view of a mid-span of a representative rotor blade, according to some embodiments.

FIG. 8 shows a cross-section view of rotor blade 201a along line 8-8 of FIG. 7. Rotor blade 201a has core 251a that may comprise a NOMEX® (E. I. du Pont de Nemours and Company, Wilmington, Del., USA) honeycomb core or other material with a lightweight structure made of aluminum, plasticized paper, or other materials. Space 253a in front of core 251a traverses the span-wise length of rotor blade 201a at leading edge 224a of rotor blade 201. Core 251a can be referred to herein as blade core 255a of rotor blade 201a. In alternative embodiments, a lightweight metal structure may be used in forming core 251a and/or other parts of rotor blade 201a.

Outer surface 257a of blade core 255a is covered with a composite material 221a. Composite material 221a may comprise an anisotropic configuration of material (e.g., stacked sheets of carbon fiber with alternating grain directions, or the like). Composite material 221a may or may not be laminate set or cured in a resin. Composite material 221 may include any one or a combination of a fiberglass composite, aluminum composite, carbon fiber, or other fiber-reinforced, resin-cured epoxy, or the like. Composite material 221a may have portions covered with other materials or strips; e.g., mid-span at line 9-9, materials such as 45-degree glass tape, uni-glass tape, copper mesh, or the like, may be layered on top of composite material 221a to provide added support and reinforcement for rotor blade 201a. It will be appreciated that other constructions are possible to provide similar properties. For example, in alternative embodiments, instead of composite material 221a, a metal could be used to cover outer surface 257a of blade core 255a.

Composite material 221a generally has an aerodynamically smooth surface. Composite material 221a forms skin 223a surrounding or encapsulating blade core 255a. Skin 223a can be manufactured as an integral piece (e.g., similar to a sleeve) or as plural pieces. FIG. 8 illustrates skin 223a as including upper skin 225a and lower skin 227a bonded to outer surface 257a of blade core 255a. Upper skin 225a and lower skin 227a form upper and lower contours of rotor blade 201a. Skin 223a may include a carbon fiber tape applied directly onto blade core 255a or to other materials forming skin 223a. In other embodiments, upper skin 225a and lower skin 227a may comprise different types of composite material 221. Alternatively or conjunctively, a composition of composite material may vary along span-wise length of rotor blade 201 on either or both upper skin 225a and lower skin 227a.

Figure 9:
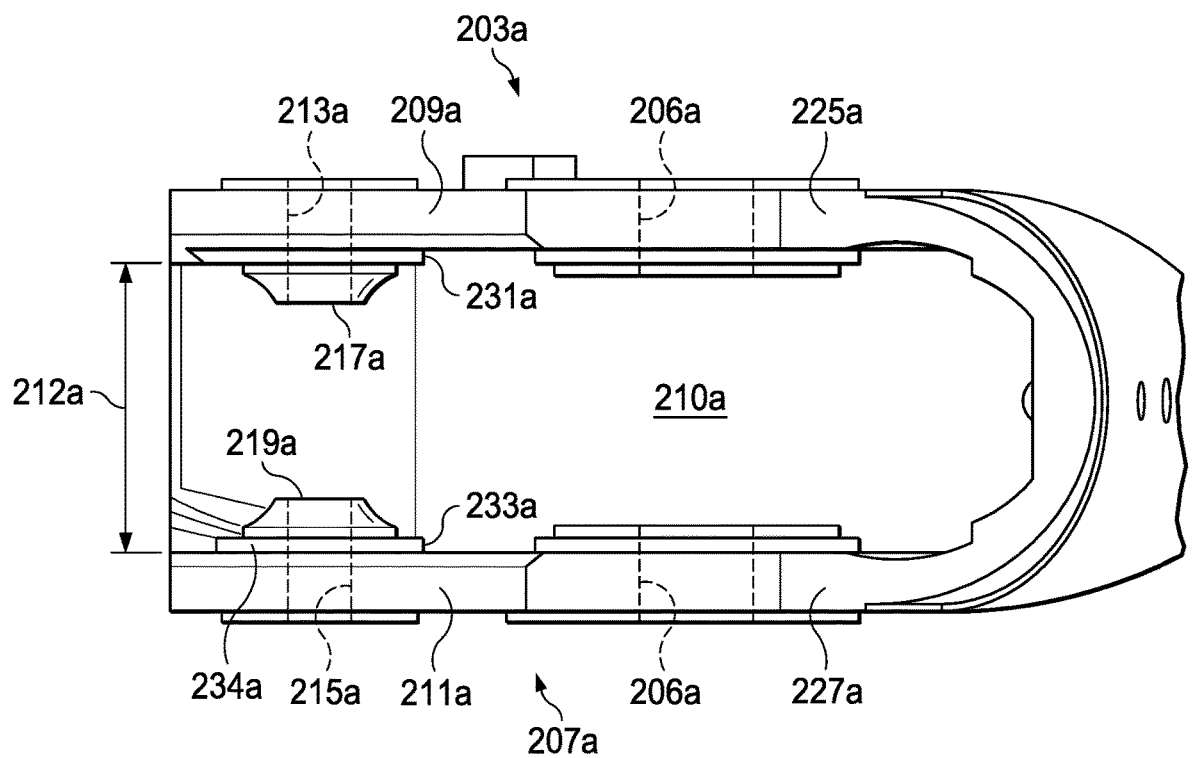
FIG. 9 representatively illustrates an orthographic view of a root end of a cuff, according to some embodiments.
Figure 10:
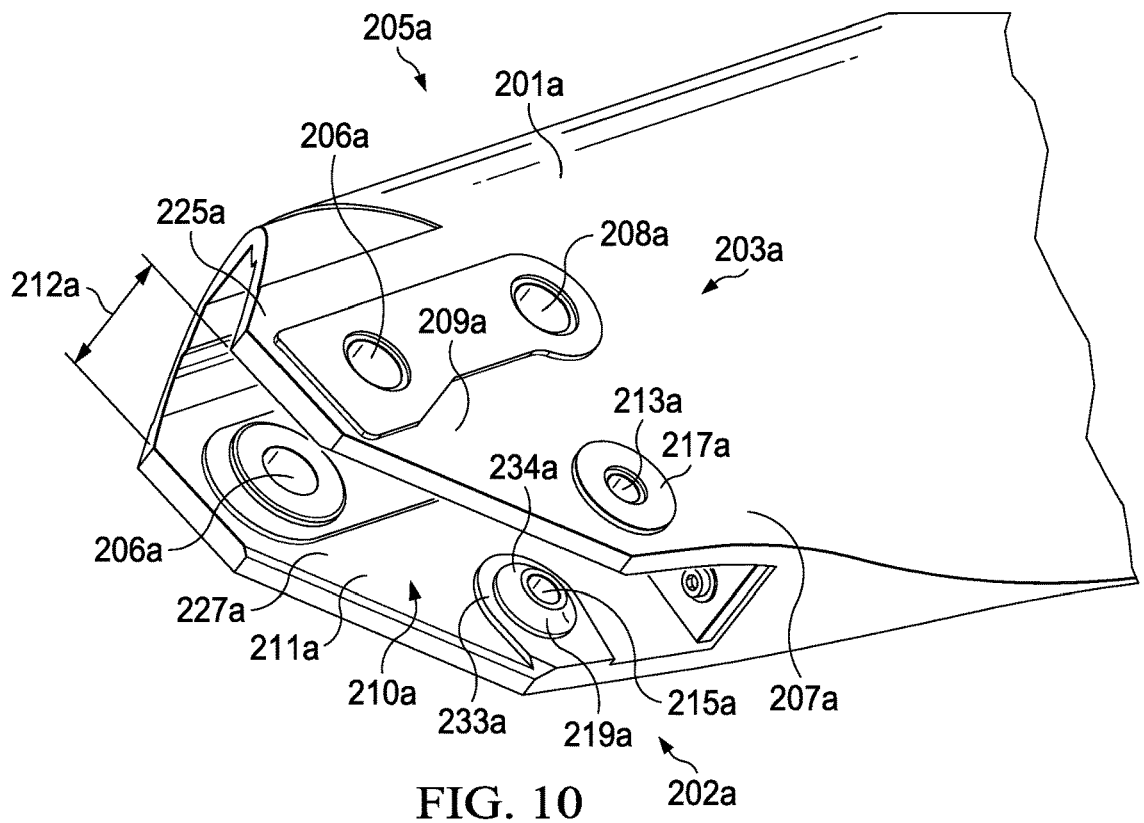
FIG. 10 representatively illustrates a perspective view of a cuff of a rotor blade, according to some embodiments.

Joint 203a includes portion 205a at root end 202a of rotor blade 201a (as previously representatively illustrated in FIG. 7 from a top view). FIGS 9-10 provide closer views of portion 205a. In some embodiments, portion 205a is integral with rotor blade 201a. Cuff 207a is formed in portion 205a on rotor blade 201a. Cuff 207a forms joint 203a for receiving and securing outboard rod end 303a of damper 301a inside cuff 207a. Cuff 207a is also configured to receive one end of the grip 126a and attach grip 126a to rotor blade 201a.

Upper skin 225a forms upper lug 209a of cuff 207a extending outwards away from blade core 255a of rotor blade 201a. Lower skin 227a forms lower lug 211a of cuff 207a extending outwards away from blade core 255a of rotor blade 201a. If composite material 221a includes a carbon fiber tape or other composite material applied as a tape to blade core 255a, upper lug 209a and lower lug 211a may also be referred as tape lugs.

In some embodiments, upper skin 225a has a thickness forming upper lug 209a of cuff 207a that is the same, substantially similar, or consistent with a thickness across a span of upper skin 225a covering outer surface 257a of blade core 255a. Similarly, lower skin 227a has a thickness forming lower lug 211a of cuff 207a that is the same, substantially similar, or consistent with a thickness across a span of lower skin 227a covering outer surface 257a of blade core 255a. It will be appreciated, however, that skin thickness may vary in other embodiments. The thickness of upper skin 225a and lower skin 227a, and composition of composite material 221a, are configured for safely and stably bearing a load in tail rotor hub 122 during operation of the rotorcraft 101. For example, certain composite materials 221a may have a certain tensile strength, tensile modulus, shear modulus, torsional stiffness, density, elasticity, coefficient of thermal expansion, or the like, suitably adapted to a particular application or load in cuff 207a.

Cuff 207a has opening 210a disposed between upper lug 209a and lower lug 211a. Opening 210a has a width with distance 212a large enough for inserting outboard rod end 303a of damper 301a into cuff 207a with additional spacing and tolerance to permit movement or articulation of damper 301a in joint 203a. Upper lug 209a may be nearly or entirely parallel to lower lug 211a to maintain a constant, or substantially constant, width or distance 212a inside cuff 207a. In other embodiments, lugs 209a, 211a may have opening 210 wide enough in one direction for inserting rod end 303a of damper 301a, but may have profile shapes that change distance 212a of opening 210a across cuff 207a.

Before drilling holes 213, 215a and configuring distance 212a in cuff 207a, washers or buffer pads 230a, 231, 232a, 233a, are applied to inner and outer surfaces of cuff 207a in area where holes 213a, 215a will be positioned in upper lug 209a and lower lug 211a. Buffer pads 230a, 231a, 232a, and 233a may comprise fiberglass or other composite material 234a. In some embodiments, composite material(s) comprising buffer pads 231a, 232a, 233a and 234a may be different from each other, or may be the same or different from composite material 221a in skin 223a.

In some embodiments, buffer pads 231a and 233a are bonded or mounted onto inner surfaces in area where holes 213a, 215a will be located before upper skin 225a and lower skin 227a are bonded to outer surface 257a of blade core 255a. Buffer pads 230a, 231a are mounted onto inner surface and outer surfaces of upper skin 225a in upper lug 209a. Buffer pads 232a, 233a are mounted onto inner and outer surfaces of lower skin 227a in lower lug 211a.

Once buffer pads 230a, 231a, 232a, 233a are applied or mounted, upper skin 225a and lower skin 227a are bonded onto outer surface 257a of blade core 255a and form cuff 207a with upper lug 209a and lower lug 211a, as described above. Then, holes 213a, 215a are bored or otherwise drilled through upper lug 209a and 211a and buffer pads 230a, 231a, 232a, and 233a. Holes 213a, 215a are drilled to be aligned with one another across opening 210a. Upper lug 209a has (e.g., through periphery of upper lug 209a) lug hole 213a. Lug hole 213a is aligned with a corresponding opposing lug hole 215a through, e.g., a periphery of lower lug 211a into opening 210a. Outboard rod end 303a of damper 301a has hole 307a disposed therein (see FIG. 4). Lug holes 213a, 215a have a same, or substantially similar, diameter.

Holes 213a, 215a—as well as earlier-described holes 206a, 208a, and other holes in other portions of tail rotor assembly 115 (e.g., holes 132a, 130a in grip 126a, and hole 307a in damper 301a)—may be manufactured or otherwise provided by one or more methods, such as: punching them out, molding a part with the hole in it, drilling a hole through a periphery of a part, or other methods now known or hereinafter derived in the art. It will be understood that "disposing a hole" or "having a hole" may include using any one or more methods to create or form the hole.

After drilling holes 213a, 215a, distance 212a across opening 210a is milled, as part of machining rotor blade 201a within a tolerance. Milling or otherwise machining will partially or completely remove some of either or both of buffer pads 231a, 233a on inner surfaces of upper lug 209a and lower lug 211a. Also, outside surface of upper lug 209a and lower lug 211a in cuff 207a is milled or otherwise machined with a tolerance, maintaining a profile or shape of rotor blade 201a. Milling or otherwise machining outer surfaces removes any hard edges that may have been created while drilling holes 213a, 215a.

Composite material 234a in buffer pads 230a, 231a, 232a, 233a, is configured to be at least partially removed when drilling holes 213a, 215a and machining distance 212a across opening 210a to be within a specified or predetermined tolerance. After drilling and machining, remaining composite material 234a is left remaining on inner surface and outer surface of cuff 207a around holes 213a, 215a, while rotorcraft is in operation 101. Buffer pads 230a, 231a, 232a, 233a may thus be referred to as "sacrificial washers" or "washers" or "buffers" made of "sacrificial fiberglass." For example, buffer pads 231a, 233a prevent, or otherwise reduce, compromising or removing unintended portions of composite material 221a making up skin 223a while machining distance 212a within a tolerance. Buffer pads 230a, 231a, 232a, 233a maintain the structural integrity of cuff 207a during manufacture, configuration, removal, and installation. The structural integrity of cuff 207a at least partially depends on upper lug 209a and lower lug 211a being less interrupted extensions of upper skin 225a and lower skin 227a from rotor blade 201a.

Figure 11:
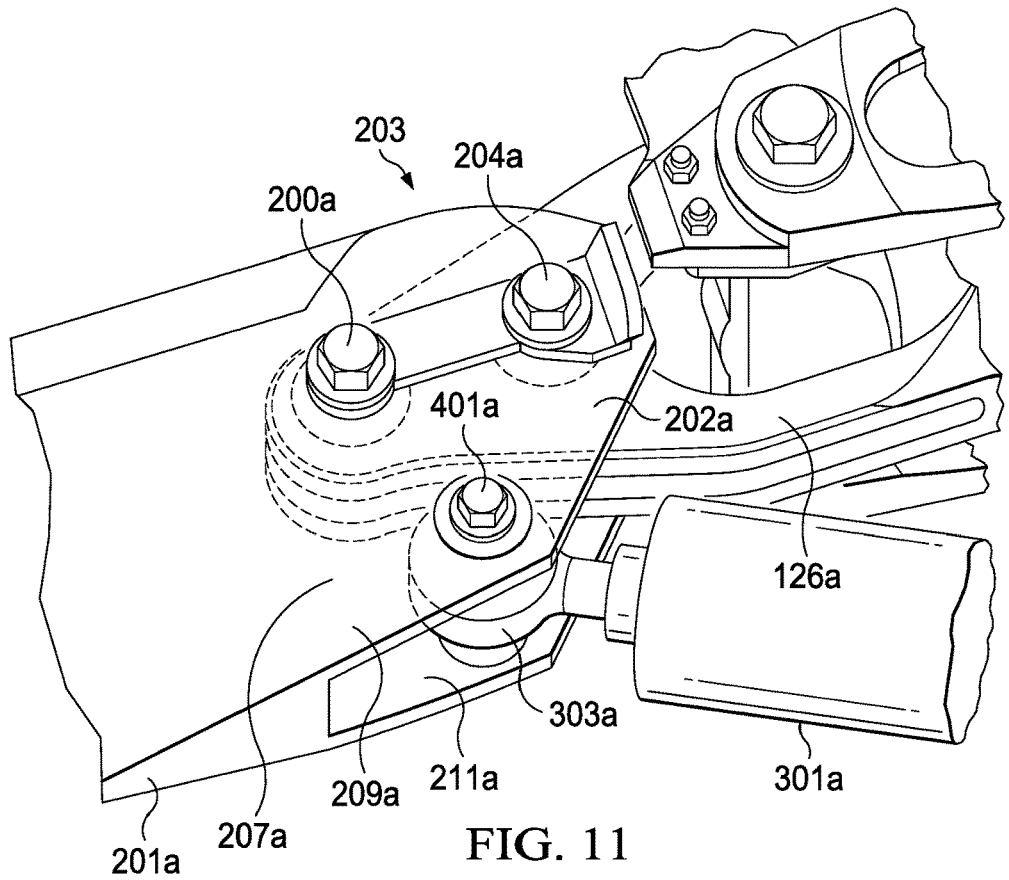
FIG. 11 representatively illustrates a perspective, top view of a joint where a damper is inserted and attached to a cuff of a rotor blade, according to some embodiments.
Figure 12:
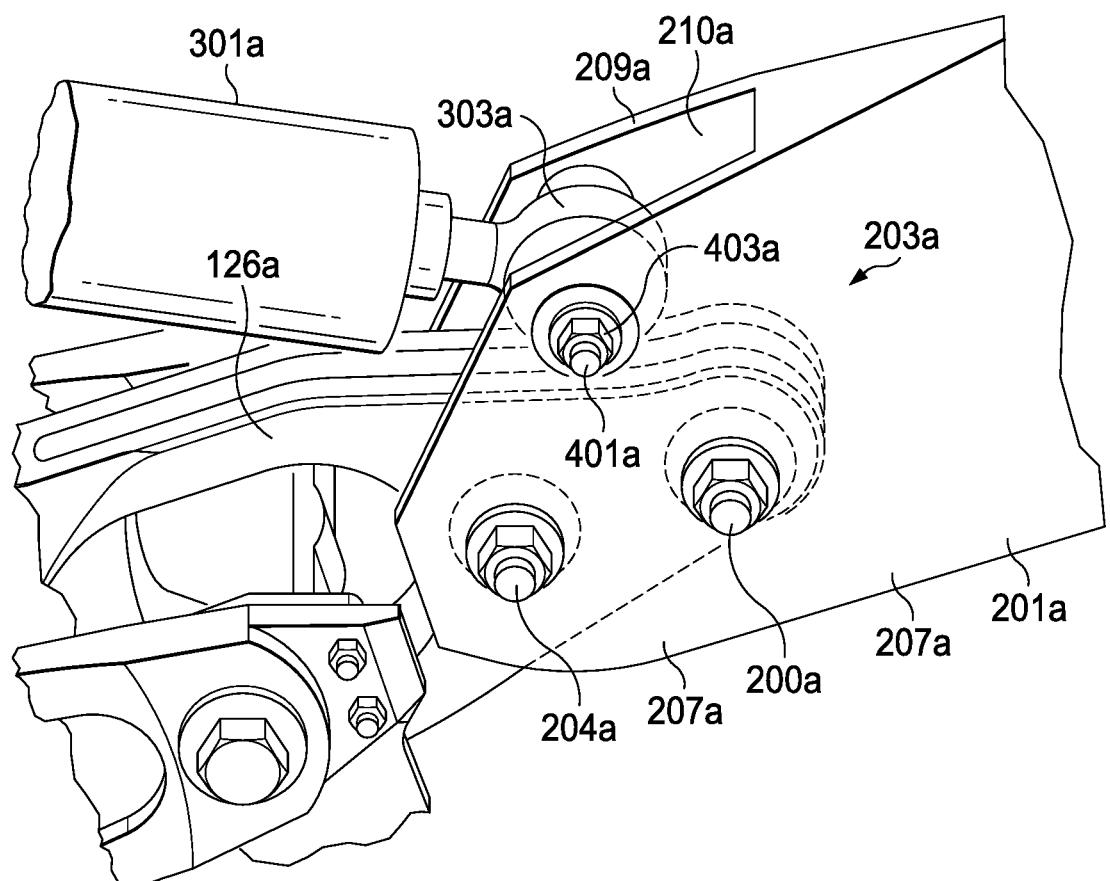
FIG. 12 representatively illustrates a perspective, bottom view of the joint of FIG. 11, according to some embodiments.

Once machining is completed, at least partially removing some composite material 234a in any one or more of buffer pads 230a, 231a, 232a, 233a, flange bushings 217a, 219a are applied to line holes 213a, 215a. Flange bushings 217a, 219a are configured to fit inside holes 213a, 215a. Flange bushings 217a, 219a are bonded to interior portions of lug holes, 213a and 215a, and are configured to accept a pin (e.g., bolt 401a, as shown in FIGS. 11 and 12). Flange bushings 217a, 219a may comprise a metal, steel, or the like. Since cuff 207a is made with composite material such as carbon fiber, as opposed to a metal, flange bushings 217a, 219a may not be thermally fit inside holes 213a, 215a. Instead, a room temperature-cured epoxy may be used. The epoxy may include a low viscosity resin, such as an EA 956 epoxy paste adhesive, to secure flange bushings 217a, 219a to interiors of holes 213a, 215a. In other embodiments, it will be understood that "bonding" flange bushings 217a, 219a, as well as other references to "bonding" in this application, may include bounding, mounting, or otherwise securing with one or more of the following methods: thermal fitting, pressure bonding, applying adhesive in between, welding, ultrasonic welding, or any other method of attachment now known or hereinafter derived in the art.

FIGS. 11 and 12 provide close-up, perspective views of outboard rod end 303a of damper 301a inserted into cuff 207a and attached to cuff 207a with bolt 401a and nut 403a. In other words, bolt 401a is carried by cuff 207a to secure outboard rod end 303a of damper 301a inside cuff 207a. Bolt 401a is long enough to secure outboard rod end 303a of damper 301a through hole 307a between upper lug 209a and lower lug 211a. Bolt 401a is secured with nut 403a around an extending portion of bolt 401a extending under lower lug 211a. Flange bushings 217a, 219a reduce damage to rotor blade 201a from repeated insertion and removal of bolt 401a in joint 203a.

As discussed above, composite material 221a forming skin 223a provides a fail-safe failure mode for cuff 207a during operation of damper 301a with rotor blade 201a. "Fail-safe" failure mode may be understood to mean, for example, that composite material 221a will visibly show fatigue or stress or wear on a surface portion of composite material 221a before cuff 207a is susceptible to catastrophic failure. Fibers on an outer surface of cuff 207a may begin to fray or separate or break away in response to fatigue or stress in joint 203a, while composite material 221a in cuff 207a continues maintaining structural integrity to continue safely bearing the load of damper 301a during operation. In some embodiments, fraying or separation or breaking away of fibers may be referred to as "delamination" of composite material 221a. In comparison, incorporating a separate, intermediate metal part to form joint 203a for attaching damper 301a may lack the above-described fail-safe failure mode features. For example, a problem with a metal part may only become visually apparent in joint 203a when the metal part would start stretching, buckling, or cracking—at which point the metal part may already be experiencing failure.

In response to visible signs of fatigue or stress or wear in composite material 221a, isolated repairs may be possible for a time (e.g., applying and curing resin, adding reinforcement composite material to the visibly frayed or worn area, or the like). If composite material 221a in rotor blade 201a becomes worn, rotor blade 201a (e.g., including integral cuff 207a) may be subject to replacement with attending costs associated with rotor blade replacement and removal of rotorcraft 101 from service.

Figure 13:
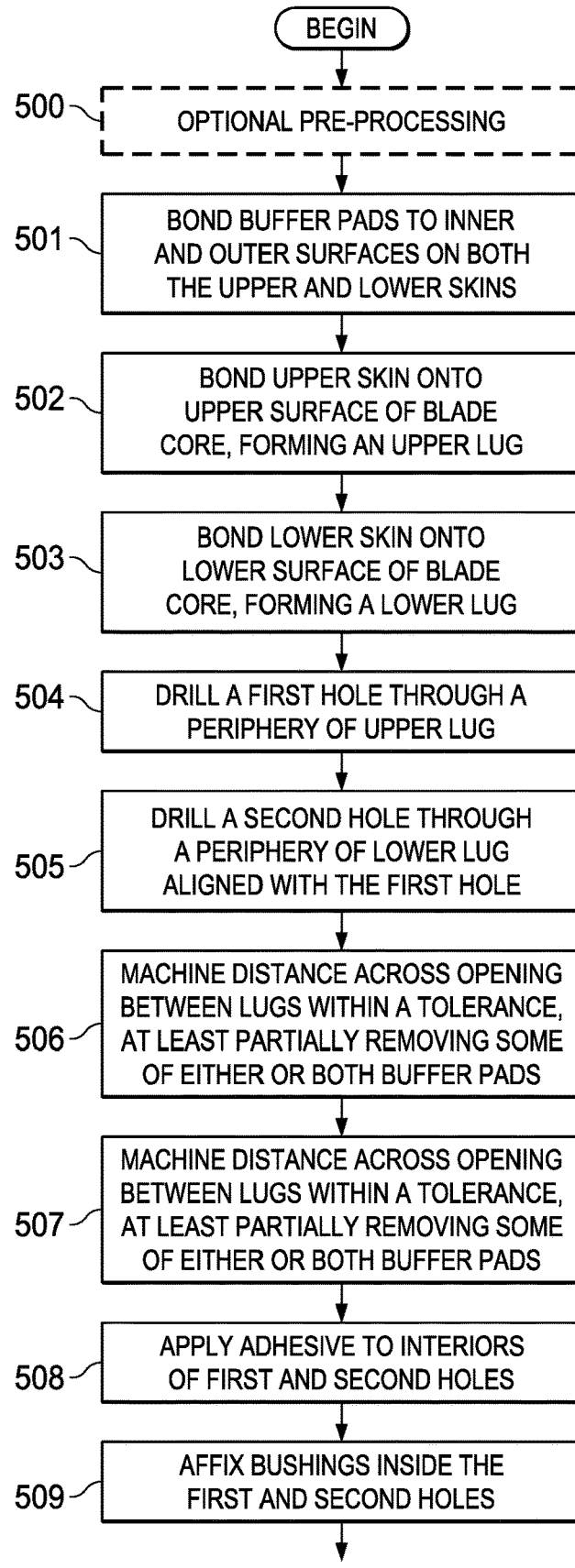
FIG. 13 illustrates a block diagram of a representative method of forming a damper attachment in a rotor blade, according to some embodiments.
Figure 14:
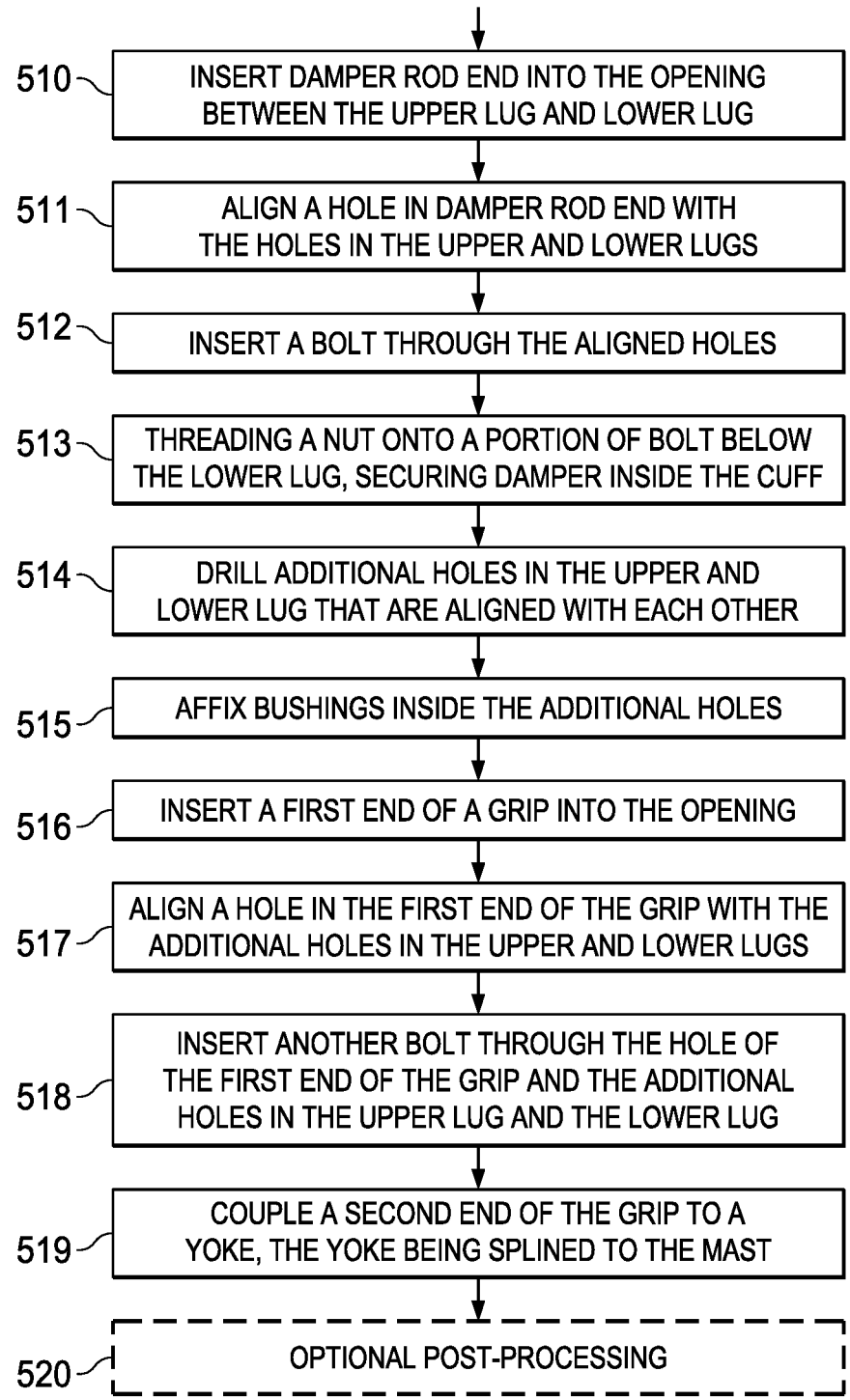
FIG. 14 illustrates a block diagram of a representative method of installing a damper inside a cuff, and configuring the cuff for attaching a rotor blade to a grip, according to some embodiments.

A representative method of forming a damper attachment in a rotor blade and attaching a damper is illustrated in FIGS. 13-14. FIG. 13 representatively illustrates at steps 500-509 a method of forming a cuff integral with a rotor blade. Step 500 is an optional step of pre-processing that may include manufacturing, or otherwise preparing, components of the damper attachment for assembly. Step 501 includes bonding buffer pads to inner and outer surface on both the upper and lower skins, in areas forming upper lug and lower lug of cuff. Step 502 includes bonding an upper skin onto the upper surface of a blade core. The upper skin extends beyond a root end of the blade core. The upper skin forms an upper lug of a cuff that is integral with a rotor blade. Step 503 includes bonding a lower skin onto a lower surface of the blade core, and forming the lower lug of the cuff. Step 504 includes disposing (e.g., drilling, punching, molding, or the like) a first hole through the upper lug. In step 505, a second hole is disposed through the lower lug that is aligned with the first hole. In step 506, a distance is machined across an opening between lugs (e.g., within a tolerance) to at least partially remove some of either or both buffer pads on the inner surfaces of the opening. In step 507, an outer surface of the upper skin and lower skin are machined within a tolerance, at least partially removing some of either or both buffer pads on the outer surfaces of the upper skin and the lower skin. In step 508, an adhesive is applied to interiors of the first and second holes. In step 509, bushings are disposed inside interior portions of the first and second holes.

FIG. 14 representatively illustrates steps 510-513 for installing the damper and steps 514-520 for attaching rotor blade to the grip. The grip, as described above with respect to some embodiments, couples the rotor blade to the yoke in the tail rotor hub.

For installing the damper, step 510 includes inserting the rod end of the damper (the outboard rod end of the damper) into the opening between the upper lug and the lower lug. Step 511 includes aligning a hole of the rod end of the damper with the holes in the upper and lower lugs. Step 512 includes inserting a bolt through the aligned holes. Step 513 includes threading a nut onto a portion of the bolt that extends below the lower lug, thereby securing the damper inside the cuff.

For coupling the rotor blade to the tail rotor hub with the grip attached inside the cuff of the rotor blade, steps 514-520 are illustrated in correspondence to steps 510-513. However, in other embodiments, steps 514-520 may be performed in a different order (e.g., before step 501, or at a same time as any of steps 510-513). Step 514 includes disposing additional holes in the upper and lower lugs that are aligned to each other. Step 515 includes affixing bushings inside the additional holes. Step 516 includes inserting a first end of a grip into the opening. Step 517 includes aligning a hole in the first end of the grip with the additional holes in the upper and lower lugs. Step 518 includes inserting another bolt through the hole of the first end of the grip and the additional holes in the upper lug and the lower lug. Step 519 includes coupling a second end of the grip to a yoke, where the yoke is splined to the mast. Step 520 is an optional post-processing step that may comprise performing various other adjustments to the cuff or the rotor assembly.

In a representative embodiment, a rotor blade includes a blade core and a material. The blade core has a root end and a tip end opposite the root end. The blade core has an upper surface and a lower surface opposite the upper surface. Each surface extends between the root end and the tip end of the blade core. The rotor blade also includes a material covering the upper surface and the lower surface of the blade core. The material extends outwards away from the blade core past the root end. The material extending outwards away from the blade core forms a cuff that is integral with the upper surface and the lower surface of the blade core. The cuff is configured to receive a first end of a damper inside the cuff.

Implementations may include one or more of the following additional features. The rotor blade may be configured to be installed in a tail rotor assembly of a rotorcraft. The tail rotor assembly comprises an articulated tail rotor hub and the rotor blade. The cuff is also configured to connect the rotor blade to the articulated tail rotor hub, in addition to receiving the first end of the damper inside the cuff. The cuff may provide a fail-safe failure mode for operating the damper with the rotor blade. The fail-safe failure mode may include visible indications of fatigue, stress, or wear on the cuff prior to the material experiencing or being susceptible to a structural failure. The material covering the blade core and forming the cuff may be a composite material comprising fiberglass or carbon fiber. Visible indications of fatigue, stress, or wear appearing on the cuff may include delamination of the composite material from or in an outer surface portion of the cuff.

The cuff may include an upper side and a lower side with an opening interposing the upper side and the lower side. The opening is wider than a thickness of the first end of the damper. The material covering the upper surface of the blade core may comprise an upper skin, and the material covering the lower surface of the blade core may comprise a lower skin. The upper side of the cuff comprises an upper lug formed with an extension of the upper skin beyond the root end of the blade core. The lower side of the cuff comprises a lower lug formed with an extension of the lower skin beyond the root end of the blade core. The first end of the damper is disposed between the upper lug and the lower lug.

The upper lug may have a first hole through its periphery into the opening, and the lower lug may have a second hole through its periphery into the opening, where the first hole opposes the second hole. The first hole and the second hole are aligned across the opening and the first and the second holes have substantially same diameters. The device may further comprise a bolt configured to be carried by the cuff through the first hole and the second hole. The first end of the damper may be an outboard rod end, and the damper may have a second hole through the outboard rod end. The outboard rod end of the damper is configured to be disposed between the upper lug and the lower lug with the hole in the damper aligned to the first hole of the upper lug and the second hole of the lower lug. The damper is configured to be attached to the rotor blade by disposing the bolt through the first hole of the upper lug, the second hole of the outboard rod end of the damper, and the second hole of the lower lug. The upper lug may include a flange bushing bonded to an interior of the first hole. The lower lug includes a flange bushing bonded to an interior of the second hole. Each flange bushing is configured to be compatible with the bolt.

The rotor blade may further comprise two upper buffer pads and two lower buffer pads. The upper washer is positioned around the first hole of the upper lug and bonded onto a lower surface of the upper lug. The lower washer is positioned around the second hole of the lower lug and bonded onto an upper surface of the lower lug that faces the lower surface of the upper lug across the opening. The upper washer and the lower washer comprise a sacrificial fiberglass material that is at least partially removed from at least one of the upper washer and the lower washer by a machining of a distance across the opening with a suitable tolerance for disposing the first end of the damper in the cuff.

Another representative embodiment comprises a rotor assembly. The rotor assembly includes a mast, a yoke, a rotor blade, a grip, and a damper. The mast has a principal axis. A mast is configured to rotate around the principal axis. The yoke is splined to the mast, and is configured to rotate with a rotation of the mast. The rotor blade is configured to rotate with the yoke around the principal axis. The rotor blade has a tip end distally disposed from the yoke and a root end proximate the yoke. The grip couples the rotor blade to the yoke at a root end of the rotor blade. The damper is coupled to the yoke and the rotor blade. The rotor blade includes a blade core and a blade sleeve. The blade sleeve includes a first portion surrounding the blade core, and a second portion extending past the blade core toward the root end of the rotor blade. The second portion of the blade sleeve forms a cuff that is integral with the rotor blade. The cuff is configured with an opening for receiving a first end of the grip and a second end of the damper, and for attaching the grip and the damper to the rotor blade inside of the cuff.

The rotor assembly may further comprise a first bolt and a second bolt. The cuff may include an upper tape lug and a lower tape lug. The opening is disposed between the upper tape lug and the lower tape lug. The cuff is configured to carry the first bolt and the second bolt between the upper tape lug and the lower tape lug. The first bolt attaches the first end of the grip to the rotor blade. The first end of the grip is disposed inside the cuff between the upper tape lug and the lower tape lug. The second bolt attaches the second end of the damper to the rotor blade. The second end of the damper is disposed inside the cuff between the upper tape lug and the lower tape lug.

Another general aspect of another representative embodiment includes a method for manufacturing a damper attachment and a method for installing the damper. An upper skin of a rotor blade is bonded onto an upper surface of a blade core of the rotor blade. The upper skin includes a composite material. A portion of the upper skin extends outwards from the root end of the blade core to form an upper lug. A lower skin of the rotor blade is bonded onto a lower surface of the blade core opposite the upper surface. The lower surface includes the composite material. A portion of the lower skin extends outwards from the root end of the blade core to form a lower lug. The upper lug and the lower lug form a cuff integral with the rotor blade. The cuff has an opening between the upper lug and the lower lug. The cuff is configured to attach the damper to the rotor blade inside the cuff.

The method may further include one or more of the following additional steps: a first hole may be disposed through the upper lug into the opening; a second hole may be disposed through the lower lug into the opening, the second hole substantially aligned with the first hole; an adhesive may be applied to an interior of the first hole and to an interior of the second hole; or a first bushing may be affixed inside the first hole and a second bushing may be affixed inside the second hole, the first and second bushings comprising flange bushings.

The method may include the using first and second washers. The first washer may be positioned around the first hole on a first inner surface of the upper lug. The first washer may comprise a second composite material. The second washer may be positioning around the second hole on a second inner surface of the lower lug, the second inner surface opposing the first inner surface across the opening. The second washer may comprise the second composite material. The first washer is bonded to the upper lug. The second washer is bonded to the lower lug. A distance is machined across the opening within a predetermined tolerance by removing at least a portion of the second composite material. The second composite material may be the same or different from the first composite material. In another embodiment, the first composite material may comprise carbon fiber tape. The second composite material may comprise fiberglass.

The method may include steps relating to attachment of the damper to the rotor blade. For example, the rod of the damper may be inserted into the opening between the upper lug and the lower lug. The damper has a third hole through the rod end. The third hole (of the damper) is aligned with the first hole and the second hole. A bolt is disposed through the first hole, the third hole, and the second hole. An extending portion of the first bolt extends below the lower lug, and a nut is threaded onto the extending portion. The first bolt and the nut secure the rod end of the damper inside the cuff.

The method may include steps further relating to attachment of the rotor blade to the grip and coupling the grip to the yoke. For example, a fourth hole may be disposed through the upper lug and a fifth hole may be disposed through the lower lug that is aligned with the fourth hole. A first end of a grip is inserted into the opening in the cuff. The grip is disposed between the lower lug and the upper lug. The grip has a sixth hole through the first end of the grip. The six hole is aligned with the fourth hole and the fifth hole. The second bolt is disposed through the fourth hole, the sixth hole, and the fifth hole. The second end of the grip, opposite the first end, is coupled to the yoke. The yoke is splined to the mast. The mast has a principal axis. The yoke is configured to rotate the rotor blade and the grip around the principal axis in correspondence to rotation of the mast.

In a representative embodiment, a rotor blade comprises a blade core having a root end and a tip end opposite the root end, the blade core having an upper surface and a lower surface opposite the upper surface, the upper surface and the lower surface extending between the root end and the tip end. The rotor blade includes a material covering the upper surface and the lower surface, the material extending outwards away from the blade core past the root end, where the material extending outwards away from the blade core forms a cuff that is integral with the upper surface and the lower surface, and the cuff is configured to receive a first end of a damper inside the cuff. The rotor blade may be configured for installation in a tail rotor assembly of a rotorcraft. The tail rotor assembly may comprise an articulated tail rotor hub and the rotor blade, and the cuff may be further configured to connect the rotor blade to the articulated tail rotor hub. The cuff may be suitably configured to provide a fail-safe failure mode for operating the damper with the rotor blade. The fail-safe failure mode may be configured to provide visible indications of fatigue, stress, or wear on the cuff prior to the material experiencing a structural failure. The material may include a composite material comprising fiberglass or carbon fiber. Visible indications of fatigue, stress, or wear may include delamination of the composite material from an outer surface portion of the cuff. The cuff may include an upper side and a lower side with an opening interposing the upper side and the lower side, where the opening is wider than a thickness of the first end of the damper. The material covering the upper surface of the blade core may comprise an upper skin, and the material covering the lower surface of the blade core may comprise a lower skin. The upper side of the cuff may comprise an upper lug formed from an extension of the upper skin beyond the root end of the blade core, and the lower side of the cuff may comprise a lower lug formed from an extension of the lower skin beyond the root end of the blade core. The first end of the damper may be disposed between the upper lug and the lower lug. The upper lug may have a first hole through its periphery into the opening, and the lower lug may have a second hole through its periphery into the opening, the first hole opposing the second hole. The first hole and the second hole may be aligned across the opening, and the first hole and the second hole may have substantially same diameters. The rotor blade may further comprise a bolt configured to be carried by the cuff through the first hole and the second hole. The first end of the damper may be an outboard rod end of the damper. The damper may have a third hole through the outboard rod end, where the outboard rod end of the damper may be configured to be disposed between the upper lug and the lower lug with the third hole aligned to the first hole of the upper lug and to the second hole of the lower lug. The damper may be configured for attachment to the rotor blade by disposing the bolt through the first hole of the upper lug, the third hole of the outboard rod end of the damper, and the second hole of the lower lug. The upper lug may include a flange bushing bonded to an interior of the first hole, and the lower lug may include a flange bushing bonded to an interior of the second hole. Each flange bushing is configured to carry the bolt.

The rotor blade may further comprise an upper outer buffer pad bonded to an upper surface of the upper lug, an upper inner buffer pad bonded to a lower surface of the upper lug, a lower inner buffer pad bonded to an upper surface of the lower lug, and a lower outer buffer pad bonded to a lower surface of the lower lug. The upper inner buffer pad is positioned opposite the upper outer buffer pad across the periphery of the upper lug. The lower outer buffer pad is positioned opposite the lower inner buffer pad across the periphery of the lower lug. The upper outer buffer pad and the upper inner buffer pad may be positioned in an area of the upper skin forming the upper lug, for forming the first hole through the upper outer buffer pad, the periphery of the upper lug, and the upper inner buffer pad. The lower outer buffer pad and the lower inner buffer pad may be positioned in an area of the lower skin forming the lower lug, for forming the second hole through the lower inner buffer pad, the periphery of the lower lug, and the lower outer buffer pad. The upper outer buffer pad, the upper inner buffer pad, the lower inner buffer pad and the lower outer buffer pad may comprise a sacrificial fiberglass material that is at least partially removed from at least one of the upper outer buffer pad, the upper inner buffer pad, the lower inner buffer pad and the lower outer buffer pad, by at least one of a machining an outer surface of the cuff within a first tolerance and machining a distance across the opening with a second tolerance. The distance across the opening is machined within the second tolerance suitable for disposing the first end of the damper in the cuff.

In another representative embodiment, a rotor assembly comprises: a mast having a principal axis, the mast being configured to rotate around the principal axis; a yoke splined to the mast, the yoke being configured to rotate with a rotation of the mast; a rotor blade configured to rotate with the yoke around the principal axis, the rotor blade having a tip end distally disposed from the yoke and a root end proximate the yoke; a grip coupling the rotor blade to the yoke at a root end of the rotor blade; and a damper coupled to the yoke and the rotor blade. The rotor blade includes a blade core and a sleeve. The sleeve includes a first portion surrounding the blade core, and a second portion extending past the blade core toward the root end of the rotor blade, where the second portion forms a cuff that is integral with the rotor blade. The cuff is configured with an opening for receiving a first end of the grip and a second end of the damper, and attaching the grip and the damper to the rotor blade inside the cuff. The rotor assembly may further comprise a first bolt and a second bolt. The cuff may include an upper tape lug and a lower tape lug. The opening may be disposed between the upper tape lug and lower tape lug. The cuff may be configured to carry the first bolt and the second bolt between the upper tape lug and the lower tape lug. The first bolt may be configured to attach the first end of the grip to the rotor blade, where the first end of the grip is disposed inside the cuff between the upper tape lug and the lower tape lug. The second bolt may be configured to attach the second end of the damper to the rotor blade, where the second end of the damper is disposed inside the cuff between the upper tape lug and the lower tape lug.

In yet another representative embodiment, a method comprises a step of bonding an upper skin of a rotor blade onto an upper surface of a blade core of the rotor blade, the upper skin comprising a first composite material, a first portion of the upper skin extending away from a root end of the blade core, the first portion forming an upper lug. A lower skin of the rotor blade is bonded onto a lower surface of the blade core, the lower surface opposite the upper surface, the lower skin comprising the first composite material. A second portion of the lower skin extends outwards from the root end of the blade core, with the second portion forming a lower lug. The upper lug and the lower lug form a cuff that is integral with the rotor blade. The cuff has an opening between the upper lug and the lower lug. The opening is configured to receive a rod end of a damper between the upper lug and the lower lug, and the cuff is configured to attach the damper to the rotor blade inside the cuff. The method may further comprise steps of disposing a first hole through the upper lug, and disposing a second hole through the lower lug, the second hole being substantially aligned with the first hole. The method may further comprise steps of applying adhesive to an interior of the first hole and to an interior of the second hole, and affixing a first bushing inside the first hole and a second bushing inside the second hole. The first bushing and the second bushing may be flange bushings, and the flange bushings may comprise steel.

The method may include using a first buffer pad comprising a second composite material and a second buffer pads comprising the second composite material. Before the bonding of the upper skin and before the bonding of the lower skin, the method may further comprise: positioning the first buffer pad on a first inner surface of the upper lug where the first hole will be disposed through the upper lug, positioning the second buffer pad on a second inner surface of the lower lug where the second hole will be disposed through the lower lug; and bonding the first buffer pad to the upper lug and bonding the second buffer pad to the lower lug. After disposing of the first hole and after the disposing of the second hole, a distance is machined across the opening within a predetermined tolerance by removing at least a portion of the second composite material. The second composite material may be the same or different from the first composite material. In another embodiment, the first composite material may comprise carbon fiber tape. The second composite material may comprise fiberglass.

The method may further comprise steps of: inserting the rod end of the damper into the opening between the upper lug and the lower lug, the damper having a third hole through the rod end; aligning the third hole with the first hole and the second hole; disposing a first bolt through the first hole, the third hole, and the second hole, wherein an extending portion of the first bolt extends below the lower lug; and threading a nut onto the extending portion of the first bolt. The first bolt and the nut may be configured to secure the rod end of the damper inside the cuff. The method may further comprise steps of: disposing a fourth hole through the upper lug; disposing a fifth hole through the lower lug that is aligned with the fourth hole; inserting a first end of a grip into the opening, disposing the grip between the lower lug and the upper lug, the grip having a sixth hole through the first end of the grip; aligning the sixth hole with the fourth hole and the fifth hole; disposing a second bolt through the fourth hole, the sixth hole, and the fifth hole; and coupling a second end of the grip to a yoke, the second end opposite the first end, the yoke being splined to a mast. The yoke may be configured to rotate the rotor blade and the grip around the principal axis of the mast in correspondence with rotation of the mast.

As used herein, the terms "comprises," "comprising," "includes," "including," "has," "having," or any contextual variant thereof, are intended to reference a non-exclusive inclusion. For example, a process, product, article, or apparatus that comprises a list of elements is not necessarily limited to only those elements, but may include other elements not expressly listed or inherent to such process, product, article, or apparatus. Furthermore, unless expressly stated to the contrary, "or" refers to an inclusive or and not an exclusive or. That is, the term "or" as used herein is generally intended to mean "and/or" unless otherwise indicated. For example, a condition "A or B" is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural connotations for such term, unless the context clearly indicates otherwise.

Further, spatially relative terms, such as "beneath," "below," "lower," "above," "upper," and the like, may be used herein for ease of description to describe one element's or feature's relationship to another element or feature as representatively illustrated in the figures. Spatially relative terms are intended to encompass different orientations of the device in use or operation, in addition to the orientation depicted in the figures. The apparatus may otherwise be oriented (rotated 90 degrees or at other orientations) and spatially relative descriptors used herein may likewise be interpreted accordingly.

Additionally, although steps or operations described herein may be presented in a specific order, this order may be changed in different embodiments. In some embodiments, to the extent multiple steps are shown as sequential in the preceding description, some combination of such steps in alternative embodiments may be performed at a same time. The sequence of operations described herein may be interrupted, suspended, or otherwise controlled by another process or system.

Examples or illustrations provided herein are not to be regarded in any way as restrictions on, limits to, or express definitions of any term or terms with which they are associated. Instead, these examples or illustrations are to be regarded as being described with respect to a particular embodiment and as merely illustrative. Those skilled in the art will appreciate that any term or terms with which these examples or illustrations are associated will encompass other embodiments that may or may not be given therewith or elsewhere in the specification, and all such embodiments are intended to be included within the scope of that term or terms. Language designating such non-limiting examples and illustrations includes, but is not limited to: "for example," "for instance," "e.g.," "etc., "or the like," "in a representative embodiment," "in one embodiment," "in another embodiment," or "in some embodiments." Reference throughout this specification to "one embodiment," "an embodiment," "a representative embodiment," "a particular embodiment," or "a specific embodiment," or contextually similar terminology, means that a particular feature, structure, property, or characteristic described in connection with the described embodiment is included in at least one embodiment, but may not necessarily be present in all embodiments. Thus, respective appearances of the phrases "in one embodiment," "in an embodiment," or "in a specific embodiment," or similar terminology in various places throughout the description are not necessarily referring to the same embodiment. Furthermore, particular features, structures, properties, or characteristics of any specific embodiment may be combined in any suitable manner with one or more other embodiments.

The scope of the present disclosure is not intended to be limited to the particular embodiments of any process, product, machine, article of manufacture, assembly, apparatus, means, methods, or steps herein described. As one skilled in the art will appreciate, various processes, products, machines, articles of manufacture, assemblies, apparatuses, means, methods, or steps, whether presently existing or later developed, that perform substantially the same function or achieve substantially similar results in correspondence to embodiments described herein, may be utilized according to their description herein. The appended claims are intended to include within their scope such processes, products, machines, articles of manufacture, assemblies, apparatuses, means, methods, or steps.

Benefits, other advantages, and solutions to problems have been described herein with regard to representative embodiments. However, any benefits, advantages, solutions to problems, or any component thereof that may cause any benefit, advantage, or solution to occur or to become more pronounced are not to be construed as critical, required, or essential features or components.

What is claimed is:
1. A device comprising:
 a rotor blade comprising:
  a blade core having a root end and a tip end opposite the root end, the blade core having an upper surface and a lower surface opposite the upper surface, the upper surface and the lower surface extending between the root end and the tip end; and
  a material covering the upper surface and the lower surface, the material extending outwards away from the blade core past the root end, wherein the material covering the upper surface of the blade core comprises an upper skin, and the material covering the lower surface of the blade core comprises a lower skin;
 wherein the material extending outwards away from the blade core forms a cuff that is integral with the upper surface and the lower surface, wherein the cuff has an upper side and a lower side, and wherein the cuff further has an opening between the upper side and the lower side, and wherein the upper side of the cuff has an upper lug disposed beyond the root end of the blade core, wherein the lower side of the cuff has a lower lug disposed beyond the root end of the blade core, wherein the upper lug is formed from an extension of the upper skin beyond the root end of the blade core, and wherein the lower lug is formed from an extension of the lower skin beyond the root end of the blade core;
 wherein the cuff is configured to receive a first end of a damper inside the cuff between the upper lug and the lower lug, and wherein the opening has a width configured to accept the first end of the damper;

wherein the upper lug has a first hole extending therethrough to the opening, and wherein the lower lug has a second hole extending therethrough to the opening, wherein the first hole is disposed across the opening from, and is aligned with, second hole, and wherein the first hole and the second hole have substantially same diameters; and wherein the cuff is configured to accept attachment of the first end of the damper between the upper lug and the lower lug by a bolt disposed in the cuff through the first hole and the second hole and extending through the first hole, through a third hole in the first end of the damper and through the second hole, and wherein the first end of the damper is an outboard rod end of the damper, the damper having the third hole through the outboard rod end.

2. The device of claim 1, wherein the rotor blade is configured to be installed in a tail rotor assembly of a rotorcraft, and the tail rotor assembly comprises an articulated tail rotor hub and the rotor blade, wherein the cuff is further configured to connect the rotor blade to the articulated tail rotor hub.

3. The device of claim 1, wherein the cuff provides a fail-safe failure mode for operating the damper with the rotor blade, the fail-safe failure mode is configured to provide visible indications of fatigue, stress, or wear on the cuff prior to the material experiencing a structural failure.

4. The device of claim 3, wherein the material is a composite material comprising at least one of fiberglass and carbon fiber, and the visible indications of fatigue, stress, or wear include delamination of the composite material from an outer surface portion of the cuff.

5. The device of claim 1, wherein the upper lug includes a flange bushing bonded to an interior of the first hole, and the lower lug includes a flange bushing bonded to an interior of the second hole.

6. The device of claim 1, wherein the rotor blade further comprises:
- an upper outer buffer pad bonded to an upper surface of the upper lug;
- an upper inner buffer pad bonded to a lower surface of the upper lug, the upper inner buffer pad positioned opposite the upper outer buffer pad across the periphery of the upper lug;
- a lower inner buffer pad bonded to an upper surface of the lower lug, the upper surface of the lower lug facing the lower surface of the upper lug across the opening; and
- a lower outer buffer pad bonded to a lower surface of the lower lug, the lower outer buffer pad positioned opposite the lower inner buffer pad across the periphery of the lower lug,
- wherein the upper outer buffer pad and the upper inner buffer pad are positioned in an area of the upper skin forming the upper lug, for forming the first hole through the upper outer buffer pad, the periphery of the upper lug, and the upper inner buffer pad,
- wherein the lower outer buffer pad and the lower inner buffer pad are positioned in an area of the lower skin forming the lower lug, for forming the second hole through the lower inner buffer pad, the periphery of the lower lug, and the lower outer buffer pad,
- wherein the upper outer buffer pad, the upper inner buffer pad, the lower inner buffer pad and the lower outer buffer pad comprise a sacrificial fiberglass material that is at least partially removed from at least one of the upper outer buffer pad, the upper inner buffer pad, the lower inner buffer pad and the lower outer buffer pad, by at least one of a machining an outer surface of the cuff within a first tolerance and machining a distance across the opening with a second tolerance, and
- wherein the distance across the opening is machined within a second tolerance suitable for disposing the first end of the damper in the cuff.

7. The device of claim 1, wherein the third hole is offset from an axis extending from the first hole through the second hole.

8. The device of claim 1, wherein the damper is a lead-lag damper.

9. A rotor assembly comprising:
- a mast having a principal axis, the mast being configured to rotate around the principal axis;
- a yoke splined to the mast, the yoke being configured to rotate with a rotation of the mast;
- a rotor blade configured to rotate with the yoke around the principal axis, the rotor blade having a tip end distally disposed from the yoke and a root end proximate the yoke;
- a grip coupling the rotor blade to the yoke at a root end of the rotor blade;
- a damper coupled to the yoke and the rotor blade; and
- a first bolt and a second bolt;
- wherein the rotor blade includes a blade core and a sleeve, the sleeve including a first portion surrounding the blade core, and the sleeve including a second portion extending past the blade core toward the root end of the rotor blade, the second portion forming a cuff that is integral with the rotor blade, and
- wherein the cuff includes an upper tape lug and a lower tape lug, and wherein the cuff has an opening disposed between the upper tape lug and lower tape lug;
- wherein flange bushings are disposed at the upper tape lug and the lower tape lug, and wherein the second bolt extends through the flange bushings;
- wherein a first end of the grip extends into the opening and the first bolt extends between the upper tape lug and the lower tape lug and attaches the first end of the grip to the rotor blade; and
- wherein an end of the damper extends into the opening and the second bolt extends between the upper tape lug and the lower tape lug and attaches the end of the damper to the rotor blade.

10. The rotor assembly of claim 9, wherein the bushings are affixed, with an adhesive, to interior surfaces of holes in the upper tape lug and lower tape lug.

11. The rotor assembly of claim 9, wherein the end of the damper that extends into the opening is an outboard rod end of the damper.

12. The rotor assembly of claim 9, wherein the damper is a lead-lag damper.

13. A method comprising:
- bonding an upper skin of a rotor blade onto an upper surface of a blade core of the rotor blade, the upper skin comprising a first composite material, a first portion of the upper skin extending away from a root end of the blade core, the first portion forming an upper lug, the upper lug having a first hole extending therethrough;
- bonding a lower skin of the rotor blade onto a lower surface of the blade core, the lower surface opposite the upper surface, the lower skin comprising the first composite material, a second portion of the lower skin extending outwards from the root end of the blade core, the second portion forming a lower lug, the lower lug having a second hole extending therethrough and aligned with the first hole; and affixing a first bushing extending into the first hole and a second bushing extending into the second hole, wherein the first bushing and the second bushing are steel flange bushings, wherein the upper lug and the lower lug form a cuff that is integral with the rotor blade, the cuff having an opening between the upper lug and the lower lug, wherein the opening is configured to receive a rod end of a damper between the upper lug and the lower lug, and wherein the cuff is configured to attach the damper to the rotor blade inside the cuff.

14. The method of claim 13, further comprising;
forming the first hole through the upper lug; and
forming the second hole through the lower lug.

15. The method of claim 14, further comprising:
applying adhesive to an interior of the first hole and to an interior of the second hole; and
wherein the affixing of the first bushing and the second bushing comprises affixing the first bushing and the second bushing with the adhesive.

16. The method of claim 14, further comprising:
before the bonding of the upper skin and before the bonding of the lower skin:
  positioning a first buffer pad on a first inner surface of the upper lug where the first hole will be disposed through the upper lug, the first buffer pad comprising a second composite material;
  positioning a second buffer pad on a second inner surface of the lower lug where the second hole will be disposed through the lower lug, the second buffer pad comprising the second composite material; and
  bonding the first buffer pad to the upper lug and bonding the second buffer pad to the lower lug; and
after the disposing of the first hole and after the disposing of the second hole:
  machining a distance across the opening within a predetermined tolerance by removing at least a portion of the second composite material.

17. The method of claim 16, wherein at least one of:
the first composite material and the second composite material comprise a same material;
the first composite material and the second composite material comprise a different material; or
the first composite material comprises carbon fiber tape, and the second composite material comprises fiberglass.

18. The method of claim 14, further comprising:
inserting the rod end of the damper into the opening between the upper lug and the lower lug, the damper having a third hole through the rod end;
aligning the third hole with the first hole and the second hole;
disposing a first bolt through the first hole, the third hole, and the second hole, wherein an extending portion of the first bolt extends below the lower lug; and
threading a nut onto the extending portion of the first bolt, wherein the first bolt and the nut secures the rod end of the damper inside the cuff.

19. The method of claim 14, further comprising:
disposing a fourth hole through the upper lug;
disposing a fifth hole through the lower lug that is aligned with the fourth hole;
inserting a first end of a grip into the opening, disposing the grip between the lower lug and the upper lug, the grip having a sixth hole through the first end of the grip;
aligning the sixth hole with the fourth hole and the fifth hole;
disposing a second bolt through the fourth hole, the sixth hole, and the fifth hole; and
coupling a second end of the grip to a yoke, the second end opposite the first end, the yoke being splined to a mast, the mast having a principal axis,
wherein the yoke is configured to rotate the rotor blade and the grip around the principal axis in correspondence with rotation of the mast.

20. The method of claim 13, wherein the rod end of the damper us an outboard rod end of the damper.